(12) United States Patent
Wilson

(10) Patent No.: US 6,299,127 B1
(45) Date of Patent: Oct. 9, 2001

(54) SOLENOID VALVE PISTON

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/599,888

(22) Filed: Jun. 23, 2000

(51) Int. Cl.$^7$ ................................................ F16K 31/145
(52) U.S. Cl. ................................................ 251/38; 251/41
(58) Field of Search .................................... 251/33, 38, 41

(56) References Cited

U.S. PATENT DOCUMENTS

| | | |
|---|---|---|
| 1,322,645 | 11/1919 | Steuer . |
| 1,756,263 | 4/1930 | Sloan . |
| 1,858,470 | 5/1932 | Sloan . |
| 2,388,990 | 11/1945 | Nelson et al. . |
| 2,438,207 | 3/1948 | Derby . |
| 2,603,794 | 7/1952 | Bokser . |
| 3,339,212 | 9/1967 | Atkins et al. . |
| 3,434,164 | 3/1969 | Forbes . |
| 3,462,769 | 8/1969 | Ichimori et al. . |
| 3,670,167 | 6/1972 | Forbes . |
| 3,695,288 | 10/1972 | Billeter et al. . |
| 3,731,025 | 5/1973 | Filliung . |
| 3,778,023 | 12/1973 | Billeter . |
| 3,863,196 | 1/1975 | Hilles . |
| 4,202,525 | 5/1980 | Govaer et al. . |
| 4,309,781 | 1/1982 | Lissau . |
| 4,327,891 | 5/1982 | Allen et al. . |
| 4,624,017 | 11/1986 | Foletta . |
| 4,667,350 | 5/1987 | Ikenaga et al. . |
| 4,682,628 | 7/1987 | Hill . |
| 4,707,867 | 11/1987 | Kawabe et al. . |
| 4,742,583 | 5/1988 | Yoshida et al. . |
| 4,793,588 | 12/1988 | Laverty, Jr. . |
| 4,805,247 | 2/1989 | Laverty, Jr. . |
| 4,826,129 | 5/1989 | Fong et al. . |
| 4,891,864 | 1/1990 | Laverty, Jr. . |
| 4,971,287 | 11/1990 | Shaw . |
| 5,062,453 | 11/1991 | Saadi et al. . |
| 5,295,655 | * 3/1994 | Wilson et al. ................ 251/40 |
| 5,431,181 | 7/1995 | Saadi et al. . |

* cited by examiner

*Primary Examiner*—John Fox
(74) *Attorney, Agent, or Firm*—Cook,Alex,McFarron,Manzo,Cummings & Mehler, Ltd.

(57) ABSTRACT

A flush valve for use on toilet devices such as urinals and water closets includes a body having an inlet and an outlet. There is a valve seat in the body and a valve member movable within the body toward and away from the valve seat to control water flow between the inlet and the outlet. A housing is mounted on the valve body and there is a chamber within the housing. A piston is movable axially within the chamber and into the valve body for contact with the valve member to cause actuation thereof. There is a spring within the chamber which normally biases the piston outwardly from the valve body. A controlled passage in the housing connects the valve body inlet and the chamber to provide water under pressure to move the piston, against the spring, into the valve body to cause operation of the valve member. The improvement comprises a groove in the exterior of the piston, which groove is adjacent and faces a wall of the chamber. There is a split ring in the groove, with the split ring being outwardly biased against the chamber wall and providing controlled water flow about the piston as it moves outwardly within the chamber in response to return force from the spring.

9 Claims, 1 Drawing Sheet

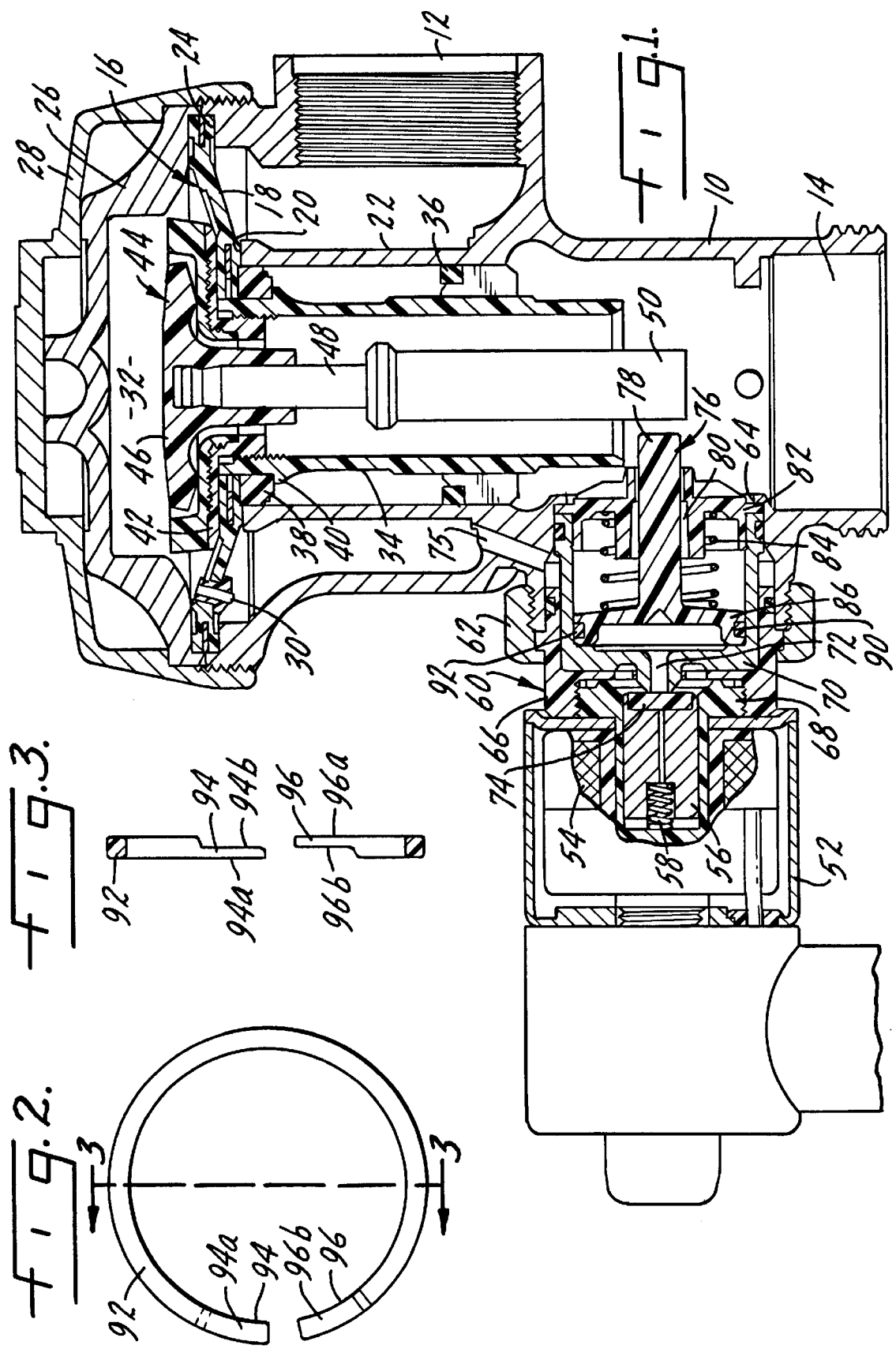

SOLENOID VALVE PISTON

THE FIELD OF THE INVENTION

The present invention relates to flush valves and in particular to flush valves in which there is hydraulic actuation of the valve member controlling flow between the flush valve inlet and outlet. Hydraulic actuators, whether they be manual or solenoid operated, use a piston which extends into the valve body of the flush valve for contact with the valve member. In prior art valves of this type there has been an elastomer seal ring on the exterior of the piston which bears against the chamber wall containing the piston. Other prior art shows a cup-type seal which performs a function similar to that of the elastomer seal. Both such valves are susceptible to failure from the seal being cut during assembly and by abrasion from solid particles in the water supply system. Also, both such valves required a bleed hole in the piston, which hole was prone to blockage.

The present invention is specifically directed at an improvement in the piston in the above-described environment. A split ring, in its free state having a diameter greater than that of the piston groove in which it resides, bears against the chamber wall as the piston moves. There is a radial force from the split ring, against the chamber wall, which provides consistent pressure, and thus consistent operation of the piston. Further, there is no need to have a perfect water-type seal and the piston split ring will provide controlled water communication about the piston as it moves during operation of the flush valve.

SUMMARY OF THE INVENTION

The present invention relates to flush valves for use with toilet devices such as urinals and water closets, and more specifically to a hydraulically operated flush valve.

A primary purpose of the invention is to provide a hydraulically operated flush valve with an improved piston having a split ring forming the movable contact between the piston and its surrounding chamber wall.

Another purpose of the invention is to provide a piston for the use described in which there is a controlled communication water passage about the piston as it moves.

Another purpose is to provide a piston for the use required having a piston ring which performs an imperfect water seal about the exterior of the piston providing controlled water communication about the piston as it moves.

Another purpose is to provide a piston and split ring as described having consistent contact pressure by the ring against the chamber or housing wall to provide consistent operation of the flush valve.

Another purpose is to provide a piston and piston ring as described, in which the friction between the piston ring and the mating housing is reduced, thereby permitting a reduced force for the restoring spring within the housing chamber.

Another purpose of the invention is to provide a piston construction as described which eliminates the failure modes of the prior art.

Other purposes will appear in the ensuing specification, drawings and claims.

BRIEF DESCRIPTION OF THE DRAWINGS

The invention is illustrated diagrammatically in the following drawings wherein:

FIG. 1 is an axial section of a flush valve of the type described illustrating the invention therein;

FIG. 2 is a plan view of the piston split ring; and

FIG. 3 is a section along plane 3—3 of FIG. 2.

DESCRIPTION OF THE PREFERRED EMBODIMENT

Hydraulically operated flush valves, those being flush valves in which water pressure from the supply side is used to move a piston to trip the flush valve operator, are well known in the art. Examples of such are shown in U.S. Pat. No. 3,778,023, which discloses a solenoid operated flush valve, and U.S. Pat. No. 3,695,288, which shows a manual version. Both the '023 and '288 patents are the property of Sloan Valve Company of Franklin Park, Ill., the assignee of the present application.

The present application is specifically directed to an improvement of the piston, which is moved by hydraulic pressure, to trip the relief valve of a diaphragm-type flush valve. More particularly, the invention is concerned with a split ring which resides in a groove on the exterior or the piston and bears against the chamber wall within which the piston moves.

In FIG. 1, the flush valve body is indicated at 10 and has an inlet 12 and an outlet 14. There is a diaphragm assembly indicated generally at 16 having a diaphragm 18 which closes upon a valve seat 20 formed at the upper end of a barrel 22 forming a part of the flush valve body. The periphery of the diaphragm 18 is seated on a shoulder 24 formed in the valve body 10 and held in this position by an inner cover 26. The inner cover in turn is held by an outer cover 28 threaded onto the exterior of the body. As is known in the art, movement of the diaphragm 18 away from the seat 20 opens communication between the flush valve inlet and outlet.

The diaphragm includes a bypass orifice 30 which provides communication between the inlet 12 and a pressure chamber 32 positioned beneath the inner cover and above the diaphragm. The water pressure within chamber 32 normally maintains the diaphragm assembly upon its seat 20.

A guide 34 is centered in the barrel 22 by a flow control ring 36. A refill ring 38 is positioned at the upper end of guide 34 and is mounted on an outwardly extending shelf 40 of the guide. A piston disc 42 is threaded to the inside of guide 34 and is used to attach the assembly of the guide and refill ring to the diaphragm 18. These elements all move in unison, as the diaphragm moves between open and closed positions of the valve.

A relief valve is indicated at 44 and includes a head 46, a stem 48 and a movable sleeve 50. The sleeve 50 will be contacted by the piston to be described hereinafter which will cause the relief valve to tilt, venting pressure chamber 32, which allows the diaphragm assembly to move off of valve seat 20, thereby opening communication between the valve body inlet 12 and its outlet 14.

As described herein, the hydraulic actuator is solenoid operated. The invention is equally applicable to a manual or pushbutton actuation of the hydraulic system.

A solenoid assembly is indicated at 52 and includes a solenoid coil 54. The coil 54 surrounds a small plunger 56, biased by a spring 58 toward the right, as illustrated in the drawings, or toward a position closing communication with the to-be-described piston.

The solenoid assembly is attached to an actuator cartridge indicated generally at 60 and mounted by a lock nut 62 to the valve body 10. The cartridge assembly will extend within an opening 64 in the valve body.

The cartridge assembly 60 includes a housing 66, attached by a bushing 68 to the solenoid assembly 52. There is a cylinder 70 within the housing 66, with the cylinder 70 having a water passage 72 which faces a seal 74 located on the end of plunger 56. Normally, the plunger and seal 74 close the passage 72, preventing water from flowing into chamber 70. The valve body 10 includes a water passage 75, which is in communication with the inlet 12 and the area circumferentially outside of the chamber 70, which provides controlled flow of inlet water to the area surrounding passage 72 which is normally closed by seal 74.

Positioned within chamber 70 is a piston 76 having a piston rod 78 positioned for contact with sleeve 50. The piston will move within a passage 80 formed in an end cap 82 closing the chamber 70. A coil spring 84 is positioned within chamber 70 and is in contact with the head 86 of piston 76 and normally biases the piston to a position away from contact with the sleeve 50.

Under normal operation, the piston will be in the retracted position shown. When electric power is applied to the solenoid coil 54, the plunger 56 will move away from passage 72 and inlet water pressure will be applied through this passage to the left-hand side of piston 76. This will drive the piston, against the force of spring 84, toward the right to a position where it contacts sleeve 50 and thus trips the relief valve 44. This will cause operation of the flush valve as described above.

The present invention is specifically concerned with an improvement in the piston 76, as shown in FIGS. 2 and 3. The head 86 of piston 76 has a peripheral groove 90 within which is mounted a split ring 92. The split ring 92, shown in the drawings in its free state, has a free state diameter greater than that of the groove 90, such that when the ring is assembled within the groove and the piston is located within chamber 70, there is a radial force from the reduced diameter of the split ring against the wall of the chamber. The cross section of the ring may be somewhat square, as shown herein, although that is not essential. The opposing ends of the split ring 92, such ends being indicated at 94 and 96, are identical in configuration. Each has an extension 94a and 96a and an adjoining and adjacent recess 96b and 94b. When the split ring 92 is positioned within groove 90 and compressed therein, the ends overlap such that extension 94a is located in recess 96b and extension 96a is located in recess 94b.

The split ring, when in position upon the piston, provides a controlled communication passage about the exterior of the piston, permitting water to flow around the piston as it is retracted by spring 84 after operation of the flush valve. This eliminates the necessity of having a bleed hole, which in prior art valves was prone to blockage. The radial force from the compressed split ring provides constant contact pressure against the interior wall of the chamber 70, thus providing consistent friction between the piston and the chamber. This in turn provides reliable, dependable and consistent operation of the piston, enabling the product to have a substantially extended life. The friction between the plastic split ring 92 and the metal housing of the chamber 70 is lower than that of prior art seal rings or piston cups which allows the force of the restoring spring 84 to be reduced. The split ring piston actuator performs consistently at low pressures, far better than an O-ring type piston or a piston having a cup-type seal. Further, the use of an elastomer in the seal between the piston and the chamber leads to failure if the seal is cut during assembly or is abraded from solid particles within the water supply. The split ring provides a consistent wiping action, consistent operation, and eliminates the need of a bypass hole which is often blocked.

Whereas the preferred form of the invention has been shown and described herein, it should be realized that there may be many modifications, substitutions and alterations thereto.

The embodiments of the invention in which an exclusive property or privilege is claimed are defined as follows:

1. A flush valve for use on toilet devices such as urinals and water closets includes a body having an inlet and an outlet, a valve seat in said body between said inlet and outlet, a valve member movable within said body toward and away from said valve seat to control water flow between said inlet and outlet, means for causing movement of said valve member away from said valve seat to connect said inlet and outlet through said valve body, including a housing on said valve body, a chamber in said housing, a piston movable axially within said chamber and into said valve body for contact with said valve member, a spring within said chamber and normally biasing said piston outwardly of said valve body, a controlled water passage in said housing connecting said valve body inlet and said chamber to provide water under pressure to move said piston, against said spring, into said valve body to cause operation of said valve member, the improvement comprising:

a groove in the exterior of said piston facing and adjacent a wall of said chamber, a split ring in said groove, said split ring being outwardly biased against said chamber wall and providing controlled water flow about said piston as said piston moves outwardly within said chamber in response to return force from said spring.

2. The flush valve of claim 1 wherein said split ring is non-metallic.

3. The flush valve of claim 2 wherein said split ring is plastic.

4. The flush valve of claim 1 wherein said split ring, in its free state, has a diameter greater than the diameter of said piston groove.

5. The flush valve of claim 1 wherein said piston ring has opposed ends, circumferentially spaced, one from another, when said split ring is in its free state.

6. The flush valve of claim 5 wherein said opposed ends overlap, when said split ring is positioned within said piston groove.

7. The flush valve of claim 6 wherein each of said opposed ends has a recess and an extension, with the extension of one end being located within the recess of the opposing end, when said split ring is positioned within said piston groove.

8. The flush valve of claim 1 including an electric actuator for causing movement of said piston.

9. The flush valve of claim 1 including a manual actuator for causing movement of said piston.

* * * * *